(No Model.)

J. STUTZENBERGER.
COMBINED SEED DRILL AND CULTIVATOR.

No. 380,061. Patented Mar. 27, 1888.

Witnesses,
Thos. Houghton.
Van Buren Hillyard.

Inventor,
John Stutzenberger.
By his Attorneys,
R.S. & A.P. Lacey.

United States Patent Office.

JOHN STUTZENBERGER, OF HIKE'S POINT, KENTUCKY.

COMBINED SEED-DRILL AND CULTIVATOR.

SPECIFICATION forming part of Letters Patent No. 380,061, dated March 27, 1888.

Application filed December 21, 1887. Serial No. 258,574. (No model.)

*To all whom it may concern:*

Be it known that I, JOHN STUTZENBERGER, a citizen of the United States, residing at Hike's Point, in the county of Jefferson and State of Kentucky, have invented certain new and useful Improvements in a Combined Seed-Drill and Cultivator; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined cultivator and planter.

The object of the invention is the production of an agricultural implement for the purposes hereinbefore mentioned which will be simple and compact in construction, adjustable in all its parts, readily convertible from a planter to a cultivator, and vice versa, easily adjusted to plant the seed or cultivate the ground at any desired depth, and susceptible of having the quantity of seed planted in a hill varied at will by regulating the stroke of the trip-lever.

The improvement consists in having the frame of the machine composed of a single casting, which is provided with extensions integral therewith, to which the handles are applied, and having slots within which the teeth are adjustable. The seed-slide is operated by a trip-lever, which is mounted on an adjustable block, the throw of the lever being adjustable by moving the said block in or out. The free end of the trip-lever projects within the path of the supporting-wheel and is operated by the spokes thereof. The roller located in the rear of the machine is adjustable to regulate the depth at which the seed are to be planted and the soil to be cultivated.

The improvement consists of the novel features and peculiar construction and combination of parts, which will be more fully hereinafter set forth and claimed, and shown in the annexed drawings, in which—

Figure 1:
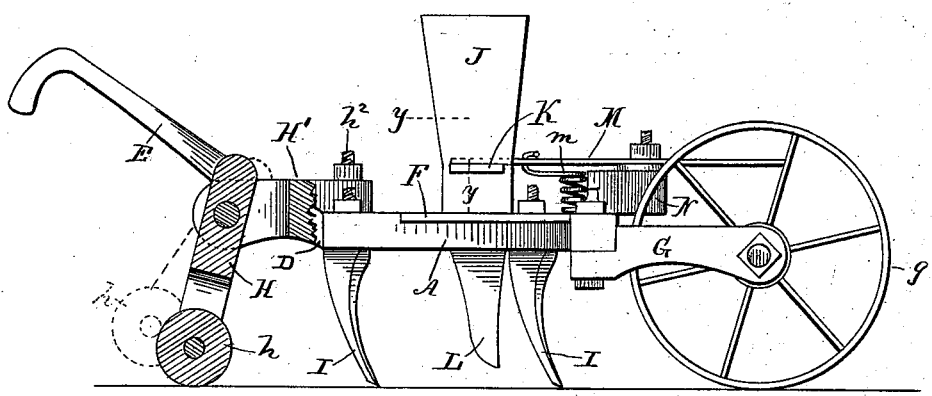
Figure 2:
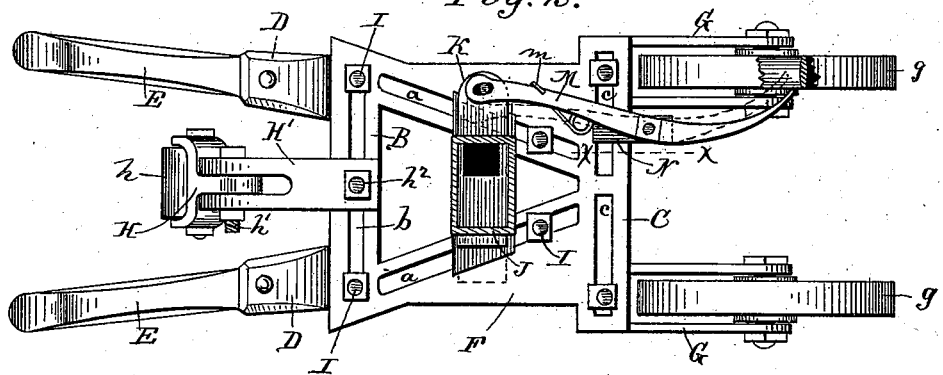
Figures 3, 4:
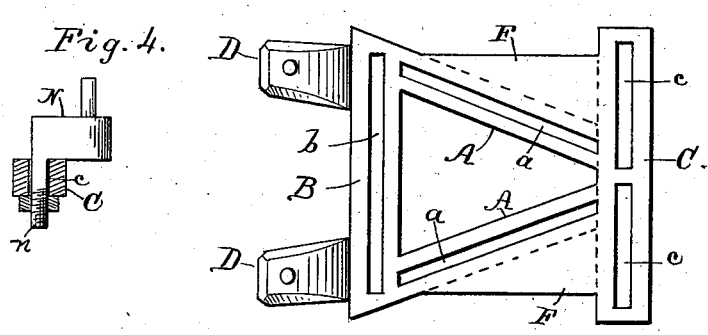
Figure 5:
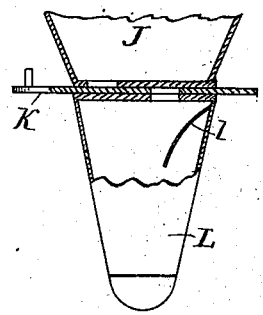

Figure 1 is a side view, parts being broken away, of a combined planter and cultivator of my invention; Fig. 2, a plan view, parts being broken away, of the said planter; Fig. 3, a top plan view of the frame; Fig. 4, a detail section on the line X X of Fig. 2, and Fig. 5 a detail section on the line Y Y of Fig. 1.

The frame—composed of the converging bars A, the rear bar, B, and the front bar, C—is provided with the extensions D, to which the handles E are bolted. The bars A A, B, and C and the extensions D are formed of a single casting, and the front bar, C, is braced by the filling-pieces F, cast in the angle between bars A A and C. The bars A, B, and C have slots $a$, $b$, and $c$, respectively. The frame is supported on the wheels $g$, which are mounted in the brackets G, held in the slot $c$ in the front bar, C, and adjustable laterally therein to adapt the cultivator to rows of plants of varying distances apart, and on the roller $h$, carried by the support H, which is pivotally connected with the bracket H' by bolt $h'$, the bracket H' is adjustably connected with the rear bar, B, of the frame by the bolt $h^2$. Being adjustable laterally, the roller $h$ can be made to run directly over the furrow, or a little to the right or left of the center of the furrow.

The cultivator-teeth I are adjustably held in the slots of the bars composing the frame, and can be readily separated or brought nearer together in the slots, being held in position by nuts applied to their upper threaded ends.

The hopper J, of ordinary construction and provided with the usual seed-slide, K, is mounted on the frame midway between its front and rear ends. The grain tube or spout L, located beneath the hopper, has a chute, $l$, near its top, which directs the grain to the center of the tube or spout.

The trip-lever M, mounted on the block N, has its inner end connected with the seed-slide K, and its outer end projected within the path of the spokes of wheel $g$, and is held in the path of the spokes of said wheel by the spring $m$, one end of which is fastened to the block N, and having the other end bent to embrace the said lever M.

The block N is held to the bar C by having its shank $n$ extending in and through said slot $c$ therein, the end of the shank being threaded and provided with a nut for holding the block in an adjusted position. When the machine is drawn forward, the spokes of the wheel $g$ strike against the outer end of the trip-lever and operate it and effect a discharge of the grain in the hopper, the amount of grain discharged being regulated by the throw of the trip-lever, which is governed by the position of the block N. The spring M returns the lever to its normal position after being operated on, and closes the slide. The frame is lowered, by adjusting the roller-support H from a vertical line, to increase the depth of cultivating and planting. For general cultivating, the roller h is detached and is replaced by cultivating-teeth.

Having thus described my invention, what I claim, and desire to secure by Letters Patent, is—

1. The herein-described frame for combined cultivator and planter, composed of converging side bars, a front and rear bar, rear extensions, and filling-pieces between the front and side bars, formed of a single casting, the side and end bars being slotted, substantially as and for the purpose specified.

2. The combination, with the frame having its front bar slotted transversely, of the wheels g and the brackets G, supporting the wheels, held adjustably in the slot of the said front bar, whereby the wheels may be adjusted nearer to or farther from each other, substantially as and for the purpose described.

3. The combination, with the frame having a transverse slot, the hopper, and the wheel, of the seed-slide, the trip-lever, and the block N, supporting the said trip-lever and provided with a shank, n, which extends through the said slot, and is threaded on its lower end to receive a nut, whereby the said block can be adjusted laterally, substantially as and for the purpose specified.

4. The combination of the frame, the supporting-wheels, the roller h, the support H, the bracket H', pivotally connected with H and adjustably connected with the frame, the hopper, the seed-slide, the trip-lever, the adjustable block N, and the spring M, substantially as described, for the purpose specified.

In testimony whereof I affix my signature in presence of two witnesses.

JOHN STUTZENBERGER.

Witnesses:
B. F. CAWTHON,
F. W. HARBSMEIER.